United States Patent [19]

Belding et al.

[11] Patent Number: 5,791,153
[45] Date of Patent: Aug. 11, 1998

[54] HIGH EFFICIENCY AIR CONDITIONING SYSTEM WITH HUMIDITY CONTROL

[75] Inventors: William A. Belding, Danville, Calif.; Spencer K. Goland, Baton Rouge, La.

[73] Assignee: La Roche Industries Inc., Baton Rouge, La.

[21] Appl. No.: 740,868

[22] Filed: Nov. 4, 1996

Related U.S. Application Data

[60] Provisional application No. 60/006,519 Nov. 9, 1995.

[51] Int. Cl.⁶ .................................................. F25D 17/06
[52] U.S. Cl. ........................................... 62/93; 62/271
[58] Field of Search .................... 62/271, 93, 94, 62/89, 90, 332

[56] References Cited

U.S. PATENT DOCUMENTS

| | | | |
|---|---|---|---|
| 2,968,165 | 12/1961 | Norbäck | 62/94 |
| 3,009,684 | 11/1961 | Munters | 257/267 |
| 3,144,901 | 8/1964 | Meek | 165/6 |
| 3,470,708 | 10/1969 | Weil et al. | 62/271 |
| 3,498,078 | 3/1970 | Sharp et al. | 62/262 |
| 3,576,114 | 4/1971 | Sharp et al. | 62/262 |
| 3,663,306 | 5/1972 | DesChamps et al. | 136/202 |
| 3,791,369 | 2/1974 | DesChamps | 126/116 |
| 3,813,893 | 6/1974 | Gemender et al. | 62/129 |
| 3,828,528 | 8/1974 | Weil | 55/388 |
| 3,835,921 | 9/1974 | Faris et al. | 165/86 |
| 3,844,737 | 10/1974 | Macriss et al. | 55/34 |
| 3,913,346 | 10/1975 | Moody, Jr. et al. | 62/197 |
| 3,977,466 | 8/1976 | Johansson | 165/40 |
| 4,042,018 | 8/1977 | Zebuhr | 165/166 |
| 4,093,435 | 6/1978 | Marron et al. | 55/269 |
| 4,134,743 | 1/1979 | Macriss et al. | 55/34 |
| 4,180,985 | 1/1980 | Northrup | 62/94 |
| 4,207,749 | 6/1980 | Lavigne, Jr. | 62/115 |
| 4,219,012 | 8/1980 | Bergen | 126/449 |
| 4,235,081 | 11/1980 | Dowling | 62/93 |
| 4,304,100 | 12/1981 | Ibrahim | 62/183 |
| 4,321,800 | 3/1982 | Gifford, Jr. | 62/150 |
| 4,321,803 | 3/1982 | Smith | 62/507 |
| 4,474,021 | 10/1984 | Harband | 62/94 |
| 4,484,450 | 11/1984 | Dolce | 62/89 |
| 4,595,403 | 6/1986 | Sago et al. | 55/389 |
| 4,621,505 | 11/1986 | Ares et al. | 62/509 |
| 4,631,926 | 12/1986 | Goldshtein et al. | 62/115 |
| 4,711,094 | 12/1987 | Ares et al. | 62/90 |
| 4,719,761 | 1/1988 | Cromer | 62/94 |
| 4,729,774 | 3/1988 | Cohen et al. | 55/269 |
| 4,769,053 | 9/1988 | Fischer, Jr. | 55/389 |
| 4,871,607 | 10/1989 | Kuma et al. | 428/186 |
| 4,924,681 | 5/1990 | DeVit et al. | 62/238 |

(List continued on next page.)

*Primary Examiner*—William Doerrler
*Attorney, Agent, or Firm*—Andrew Alexander

[57] ABSTRACT

A heat recovery, dehumidifier and cooling system for ventilating fresh air to a conditioned space. The system is comprised of an enthalpy wheel or body for treating incoming fresh air to remove heat and moisture therefrom and means such as a duct for introducing fresh air to a first segment of the enthalpy wheel or body. A heat exchanger is provided in communication with the enthalpy wheel or body to receive pre-conditioned air having heat and moisture removed therefrom, the heat exchanger further lowering the temperature of the pre-conditioned air. A refrigerated surface is provided in a first communication with the heat exchanger to receive pre-conditioned air exiting from the sensible heat exchanger, the refrigerated surface further treating the pre-conditioned air to provide refrigerated air leaving the refrigerated surface having both lowered temperature and humidity. The refrigerated surface is provided in second communication with the heat exchanger to permit the refrigerated air leaving the refrigerator surface to be in heat exchange relationship with the pre-conditioned air from the enthalpy wheel or body as the pre-conditioned air passes through the sensible heat exchanger, the pre-conditioned air warming the refrigerated air as the conditioned air passes through the sensible heat exchanger to provide conditioned air.

44 Claims, 5 Drawing Sheets

U.S. PATENT DOCUMENTS

| | | | |
|---|---|---|---|
| 5,024,063 | 6/1991 | Erickson | 62/101 |
| 5,040,375 | 8/1991 | VonDobeln | 62/94 |
| 5,052,188 | 10/1991 | Komarneni et al. | 62/94 |
| 5,079,929 | 1/1992 | Alsenz | 62/117 |
| 5,115,644 | 5/1992 | Alsenz | 62/181 |
| 5,174,130 | 12/1992 | Lucas | 62/498 |
| 5,179,998 | 1/1993 | DesChamps | 165/1 |
| 5,181,387 | 1/1993 | Meckler | 62/59 |
| 5,263,341 | 11/1993 | Lucas | 62/498 |
| 5,303,771 | 4/1994 | DesChamps | 165/165 |
| 5,325,676 | 7/1994 | Meckler | 62/93 |
| 5,333,677 | 8/1994 | Molivadas | 165/32 |
| 5,353,606 | 10/1994 | Yoho et al. | 62/271 |
| 5,372,182 | 12/1994 | Gore | 165/7 |
| 5,373,704 | 12/1994 | McFadden | 62/94 |
| 5,386,709 | 2/1995 | Aaron | 62/199 |
| 5,419,155 | 5/1995 | Boehde et al. | 62/470 |
| 5,423,187 | 6/1995 | Fournier | 62/94 |
| 5,438,846 | 8/1995 | Datta | 62/238 |
| 5,448,895 | 9/1995 | Coellner et al. | 62/94 |
| 5,564,281 | 10/1996 | Calton et al. | 62/90 |
| 5,959,970 | 10/1990 | Meckler | 62/176.1 |

HIGH EFFICIENCY AIR CONDITIONING SYSTEM WITH HUMIDITY CONTROL

CROSS REFERENCE TO RELATED APPLICATION

This application claims the benefit of U.S. Provisional Application No. 60/006,519, filed Nov. 9, 1995.

BACKGROUND OF THE INVENTION

This invention relates to air conditioning and more particularly, it relates to an improved air-conditioning system utilizing a heat recovery and dehumidifier system.

ANSI/ASHRAE Standard 62-1989 has been established to address the need for increased ventilation of buildings due to poor indoor air quality. Increased levels of contaminants from humans, fuel burning appliances, building materials and furnishings have resulted from the current construction practices which produce tighter, low leakage buildings. For example, volatile organic compounds (VOCs) such as formaldehyde have been identified which with continued exposure can cause illness. Recommended ventilation rates proposed in this standard have been increased over previous standards and can range from about 15% at the low end to 100% for buildings such as hospitals and laboratories. The actual level of recommended outdoor air depends on the use, size and occupancy of the building.

Indoor air quality is also affected by the presence of living organisms in the circulated air. Bacteria, mold and mildew, for example, thrive on the damp air in air conditioning ducts. For this reason, recommended relative humidity levels are maintained at or below 60% where these organisms do not reproduce. In damp climates, bringing increased levels of outdoor air into the building has made it difficult to maintain interior humidity below 60%. Electric vapor compression systems remove humidity by water condensation across a cold coil. The dehumidification process only occurs when the equipment is operating. When the system cycles off and air enters the building, humidity increases. Many buildings, especially newer ones, have a portion of their air conditioning system dedicated to treating 100% outdoor air. These units can operate continually and, therefore, perform a better job of dehumidification. In very damp climates, this approach, however is still not sufficient to maintain the building relative humidity below 60%. Therefore, many systems have been designed to overcool the air and then the supply air is reheated to a comfortable temperature. This eliminates the cold clammy feel of the air but the systems are very inefficient in that energy is expended for both cooling and reheating.

U.S. Pat. No. 5,179,998, assigned to Deschamps Laboratories, Inc. discloses a heat recovery ventilating dehumidifier which provides fresh, cool, low relative humidity air to a building or room during warm weather, and warm fresh air during cold weather. Fresh air is drawn into the heat recovery ventilating dehumidifier, cooled and dehumidified by heat exchange by exhausting stale air in a first heat exchanger, then further cooled and dehumidified by passage through a refrigerant coil. After passage through the refrigerant coil the fresh cool air passes through a second heat exchanger, cooling exhausting stale air and in exchange becoming less cool to reduce the relative humidity. The cool, fresh air having a lowered relative humidity is then used to ventilate a building or room. The cooled exhausting stale air then passes through the first heat exchanger cooling the fresh warm incoming air. However, there is always a need for improved efficiency in this type of system.

U.S. Pat. No. 5,372,182 discloses a modular recuperator apparatus and method that is used to pre-condition air treatment in a HVAC and air processing systems. A modular recuperating system enhances the overall efficiency of modern HVAC systems by reducing the required relative treatment of air within the system by supplying pre-conditioned fresh air into the system.

U.S. Pat. No. 3,977,466 discloses a room air conditioning apparatus for exchanging heat and/or moisture between fresh atmospheric air entering the room from the outside and consumed air being discharged from the room. This apparatus combines high capacity with relatively small dimensions, low air velocities and small pressure drops so as to minimize generation of disturbing noise. Within a casing, a motor-driven regenerative-type rotor passes through two air stream zones in the first of which is a motor-driven fan for discharge of consumed room air into the outer atmosphere and in the second of which is a motor-driven fan for supply of fresh air to the room from the outer atmosphere. In the rotor, the two air streams exchange heat and/or moisture content so that the supply of fresh air is given a desired, predetermined temperature and a desired moisture content.

U.S. Pat. No. 4,180,985 discloses an improved method and apparatus for air conditioning, using a refrigeration system. The disclosed method and apparatus provide for a refrigeration type air conditioning system to be equipped with a regeneratable desiccant for contacting moist feed air prior to passing the feed air across evaporator coils of the system. The desiccant removes a substantial portion of moisture from the feed air, thereby improving the efficiency of the air conditioning system. The desiccant material is regenerated by utilizing waste heat that is removed from the condenser of the air conditioning system.

Thus, it will be seen that there is still a great need for an improved system which provides substantially more cooling than provided by an evaporator. The present invention provides such an improved system.

SUMMARY OF THE INVENTION

It is an object of this invention to provide an improved air-conditioning system.

It is another object of this invention to provide an air-conditioning system utilizing heat recovery and dehumidification.

Yet, it is a further object of this invention to provide an improved air-conditioning and ventilating system utilizing an enthalpy wheel, a heat exchanger and a refrigerated surface to provide fresh air having both lowered temperature and humidity.

These and other objects will become apparent from the specification and drawings appended hereto.

In accordance with these objects, there is provided a heat recovery, dehumidifier and cooling system for ventilating fresh air to a conditioned space. The system is comprised of an enthalpy wheel or body for treating incoming air to remove heat and moisture therefrom and means such as a duct for introducing incoming air to a first segment of the enthalpy wheel or body to provide pre-conditioned air. A sensible heat exchanger is provided in communication with the enthalpy wheel or body to receive pre-conditioned air having heat and moisture removed therefrom, the heat exchanger further lowering the temperature of the pre-conditioned air. A refrigerated surface is provided in a first communication with the heat exchanger to receive pre-conditioned air exiting from the heat exchanger, the refrigerated surface further treating the pre-conditioned air to provide refrigerated air leaving the refrigerated surface having both lowered temperature and humidity. The refrigerated surface is provided in second communication with the heat exchanger to permit the refrigerated air leaving the refrigerator surface to be in heat exchange relationship with the pre-conditioned air from the enthalpy wheel or body as the pre-conditioned air passes through the heat exchanger, the pre-conditioned air warming the refrigerated air as the refrigerated air passes through the heat exchanger to provide conditioned air. Further, the heat exchanger is provided in communication with the space to be conditioned to supply the conditioned air thereto. Means is provided for returning air from the conditioned space to the enthalpy wheel or body thereby providing a return air, and means is provided for passing the return air through a segment of the enthalpy wheel or body to exchange sensible and latent heat from the return air to the enthalpy wheel or body thereby cooling the enthalpy wheel or body. Means is provided for exhausting the return air to the atmosphere after passing through the enthalpy wheel or body.

DETAILED DESCRIPTION OF THE PREFERRED EMBODIMENTS

Figure 1:
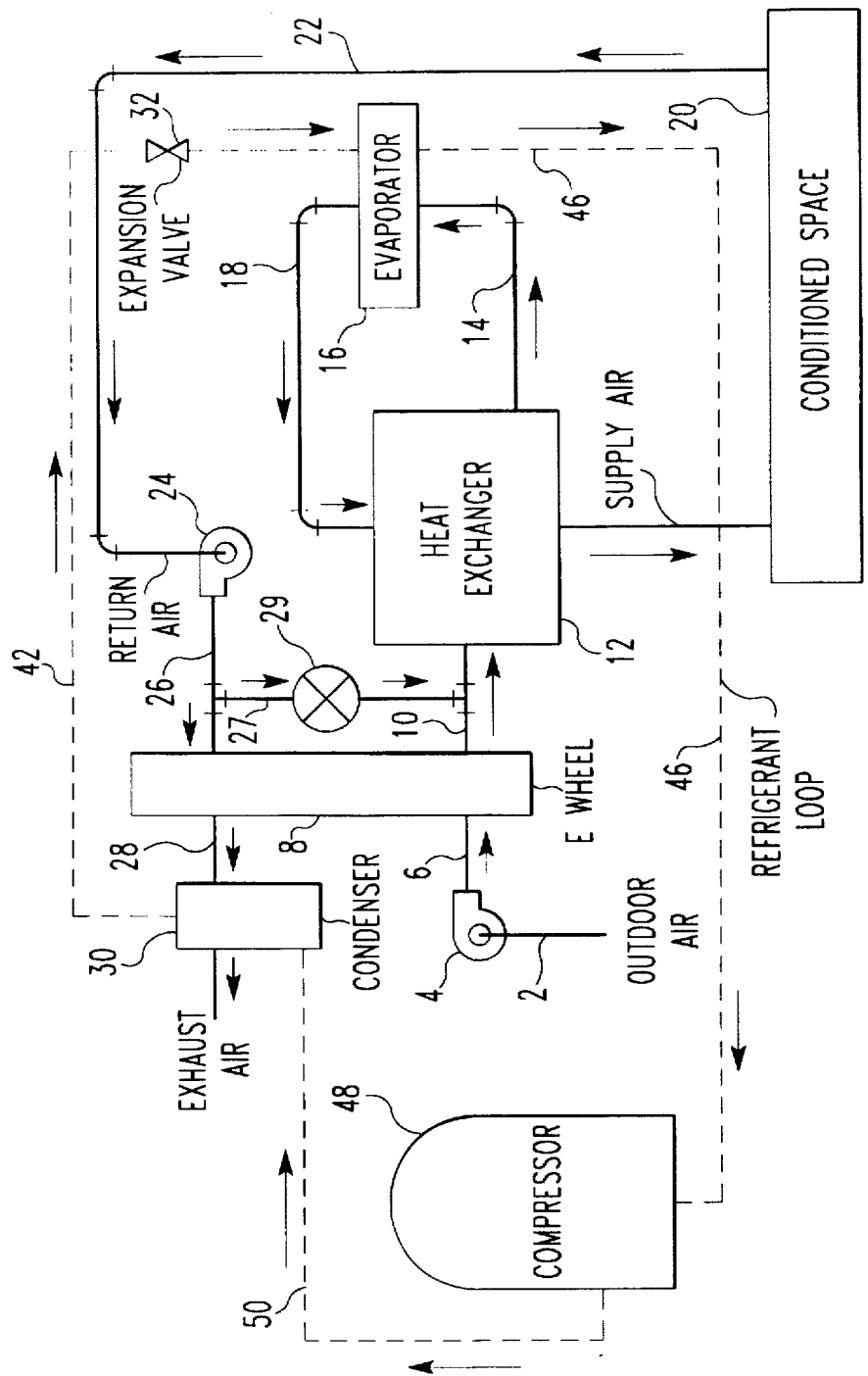
FIG. 1 is a flow chart showing steps of the invention incorporating the use of an enthalpy wheel, a heat exchanger and refrigerated surface for conditioning air.

Referring now to FIG. 1, there is shown a schematic flow chart illustrating steps in the invention. Generally, outdoor air or process air is introduced along line 2 to pump or blower 4. From pump or blower 4, process air is introduced along line 6 to enthalpy or heat wheel 8 where both heat and moisture are removed. After leaving enthalpy wheel or heat wheel 8, process air is passed along line 10 to sensible heat exchanger 12 where the temperature of the process air is reduced further. Condensation occurring in the heat exchanger can be removed using a drip pan and drain. Process air from heat exchanger 12 is removed along line 14 to evaporator coil 16 where the process air is cooled to a low temperature and also the humidity of the process air is reduced to provide chilled air having reduced humidity. The chilled process air from evaporator coil 16 is directed along line 18 to a second side of heat exchanger 12 where the temperature of the chilled process air is heated before being introduced along line 19 to conditioned space 20. Return air is removed from conditioned space 20 along line 22 using pump or blower 24. Return air from blower 24 is directed along line 26 where it is introduced to enthalpy or heat wheel 8 where it removes heat and moisture as it passes through heat or enthalpy wheel 8. After removing heat and moisture from wheel 8, the return air may be exhausted to the atmosphere or it may be introduced along line 28 to contact condenser coil 30 for cooling refrigerant before being exhausted to the atmosphere. Additional outdoor air may be added to line 28 if additional air is needed for condenser cooling. Alternatively, the condenser may be cooled by outside air.

Means may be provided for diverting a portion of the return air from line 26 through line 27 into line 10 to provide a mix of return air and process air for introducing to heat exchanger 12. The amount of return air diverted into line 10 can be controlled by baffle or valve 29. Diverting a portion of the return air has the advantage that it lowers the load on the compressor and enthalpy wheel because it lowers the amount of outdoor air that has to be treated.

For purposes of providing refrigerant cooling, hot refrigerant is removed from condenser coil 30 along line 42 to expansion valve 32 and then into evaporator 16 where the refrigerant vaporizes and cools the process air to provide chilled air, e.g., 56° F. The vaporized refrigerant passes along line 46 to compressor 48 where it is compressed. Then, the compressed refrigerant vapor passes along line 50 to condenser coil 30 where it is liquefied.

A heat exchanger useful in the present invention can include an air-to-air heat exchanger, a heat pipe, or an air-to-liquid heat exchanger. In the use of a heat pipe, pre-conditioned air contacts a portion of the heat pipe prior to the pre-conditioned air contacting the evaporator. The pre-conditioned air is cooled and the fluid in the heat pipe is heated resulting in a phase change from liquid to vapor. At another portion of the heat pipe, the fluid is chilled by the refrigerated air condensing vapor to liquid. Thus, the refrigerated air is conditioned before entering the conditioned space. However, any heat exchanger can be used which transfers heat from the process air to the chilled or refrigerated air leaving evaporator 16. It will be appreciated that different arrangements may be used to transfer heat from the process to the chilled air, and such arrangements are contemplated within the purview of the invention.

The present invention has the advantage that it can efficiently introduce fresh ventilation air having controlled humidity to a building or space to be conditioned, even in hot moist climates. This advantage comes about, in part, by use of an enthalpy wheel in combination with a heat exchanger and an evaporation coil. This process is an effective way to gain or improve compression cycle capacity and overall coefficient of performance (COP).

By lowering the temperature and humidity of the process air entering the heat exchanger by use of the enthalpy wheel, the temperature of process air entering the evaporator has a lowered temperature and humidity. This results in higher cooling capacity of the evaporator. Air leaving the evaporator coil will be saturated at this colder temperature, giving a dew point temperature essentially equivalent to the dry bulb temperature.

Normally, an evaporator coil is not operated at a temperature cold enough to provide a conditioned space humidity which is too low. Coil temperatures below 40° F. would be required to give less than 30% relative humidity at 72° F. in a conditioned space.

While the invention has been described with respect to the use of an enthalpy wheel, a heat exchanger and a refrigerant cooling coil or evaporator coil, it will be appreciated that any means which withdraws heat from the process air and transfers heat to the process air leaving the evaporator coil is contemplated within the purview of the invention. That is, the chilled air leaving the evaporator can be tempered by utilizing heat or removing heat from the process air to provide conditioned air for introducing to the conditioned space.

In the present invention, heat or enthalpy wheel 8 can be fabricated from any material which is effective in removing heat and moisture from incoming air on a continuous basis and which can be regenerated on a continuous basis.

Figure 2:
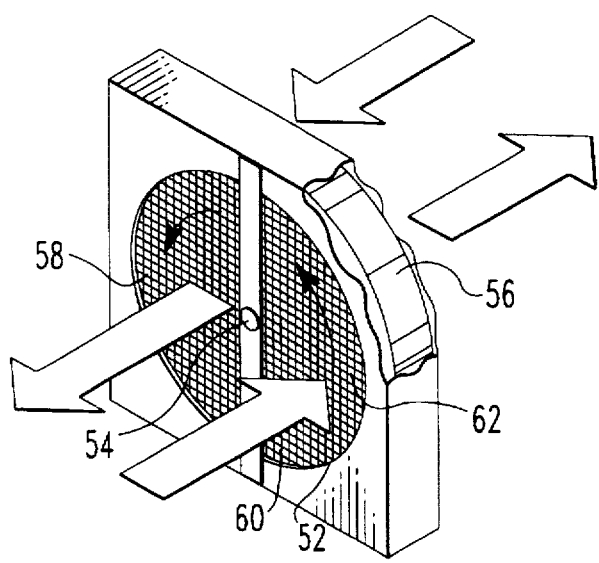
FIG. 2 shows a heat exchange wheel in a cassette.

Referring now to FIG. 2, there is shown a schematic of an enthalpy wheel 52 in accordance with the invention. The wheel, which is shown in a cassette, has a central hub and shaft 54 for support means for supporting the wheel within the cassette and a cylindrical outer casing 56. Other support means may be used. Further, the wheel may have radial spokes extending from hub 54 to outer casting 56. Schematically, wheel 52 is shown divided into two parts, 58 and 60. An exhaust air stream is shown exiting through part 58 and air or inlet stream is shown flowing through part 60 countercurrent to the exhaust stream. Wheel 52 transfers both latent and sensible heat energy from the exhaust stream from a room or building or the like to the intake stream to the room from a fresh air supply stream. Depending on the season, in winter, for example, moisture in the exhaust stream is adsorbed by the wheel and desorbed into the inlet stream. In summer, moisture in the make-up air is adsorbed by the wheel and removed from the wheel by the drier exhaust stream. Also, in summer, the enthalpy wheel operates to cool the warm make-up air. That is, the enthalpy wheel absorbs heat from the make-up air and transfers or exchanges the heat in the make-up air to the exhaust stream of air. These functions are performed on a continuous basis as the wheel rotates and is regenerated by the countercurrent flow. The wheel typically rotates at a speed of about 1 to 50 rpm.

Between central hub 54 and outer casing 56 is a total heat energy and moisture exchange or adsorbent media 62. In one embodiment, the media is fabricated by providing alternating layers of flat and corrugated adsorbent paper or desiccant paper that is positioned to provide a multiplicity of open-ended passages parallel to the axis of rotation to permit air to flow therethrough. Typically, the media is formed by winding a web of corrugated adsorbent paper or desiccant paper (having a flat sheet of paperboard bonded to one side) around hub 54 until a multi-layered media is built up that extends to outer casing 56. The corrugated adsorbent or desiccant paper having one side flat is made by bonding or positioning a flat strip of paperboard over a corrugated strip of desiccant paper. The width of the strip determines the width of the wheel and the edges of the paperboard forms the faces of the wheel. It should be understood that other fabrication techniques that form passages, e.g., honeycomb-shaped passages and the like, may be used, all of which are contemplated within the purview of the invention.

While reference is made herein to paperboard, it should be understood that the corrugated strip of desiccant paper may be bonded to a flat strip of metal such as copper or aluminum. Alternatively, metal coated with an adsorbent can be corrugated and wrapped or a metal corrugated or honeycomb shape can be subsequently coated with adsorbent.

It should be understood that while the invention is described in wheel form, the invention can include a monolith of adsorbent or total heat energy and moisture exchange media and an airstream for conditioning or regeneration may be directed alternately between different parts of the media. Or, a fixed enthalpy exchanger which is comprised of a moisture permeable membrane may be used. That is, a membrane which is permeable by moisture to transfer both latent and sensible heat may be used. The moisture-permeable membrane can be free of desiccant. Further, while the desiccant or adsorbent paper is described having the desiccant or adsorbent incorporated therein during fabrication of the paper, the paper may be formed and desiccant or adsorbent coated thereon. Or, a combination of desiccant or adsorbent incorporation during paper making and coating with desiccant or adsorbent thereafter may be used.

The improved desiccant paper in accordance with the invention is comprised of desiccant or adsorbent, fibrous material and optional binders.

The desiccant can be any material capable of efficiently adsorbing moisture from an air stream and capable of efficiently desorbing said moisture to a counter flowing air stream. Thus, the desiccant can comprise the use of finely powdered solid, crystalline compounds capable of adsorbing and desorbing moisture from or to an air stream. Examples of such adsorbants are silica gels, activated aluminas and molecular sieves or zeolites and the like and mixtures of these compounds. Other compounds that may be used are halogenated compounds such as halogen salts including chloride, bromide and fluoride salts, for example.

The preferred desiccants are zeolites. The zeolites can be natural crystalline zeolites such as stilbite or synthetic crystalline alumino-silicates referred to as molecular sieves. These materials are activated for adsorption by removing physically adsorbed water from openings in their molecular structure. Further, crystalline zeolites are preferred desiccants over alumina and silica gel because they exhibit less hysteresis during desorption which provides a more efficient moisture exchange between exit and intake air streams. In addition, zeolites are preferred desiccant material over activated aluminas and silica gels because activated aluminas and silica gels have a wide pore size distribution, 8 Å to 70 Å for activated aluminas and 8 Å to 100 Å for silica gels. The large pores in the structure can retain airborne contaminants, some of which may impart odor, and these compounds can be desorbed into the make-up air stream returning the contaminants and odors to the building. Thus, purification of air in the building has been compromised. Thus, it is preferred to select an adsorbent that rejects airborne contaminants. That is, the adsorbent should have a pore size large enough to adsorb moisture but small enough to reject air-borne contaminants. In certain instances, the silica and alumina can be combined with the zeolite, depending on the shape of the isotherm desired. For purposes of the invention, synthetic zeolites are preferred over natural zeolites because the natural-occurring zeolites can have a broader pore size distribution.

Synthetic zeolites include zeolites A, D, L, R, S, T, X and Y. Zeolite A is a crystalline zeolite having the general formula:

$$1\pm0.2M_{2-n}O:Al_2O_3:1.85\pm0.5SiO_2:yH_2O$$

wherein M is metal, n is the valence of M and y may be any value up to 6. The zeolitic molecular sieves generally known in the art as 4A molecular sieves have a pore diameter of about 4 Å and have an alumino silicate crystalline structure A with sodium cations. 3A sieves have an alumino silicate structure A with sodium and potassium cations. In 3A molecular sieves, most of the sodium cations in a 4A molecular sieve are substituted with potassium cations which results in most of the pores in a 3A molecular sieve being 3 Å in diameter. In 5A molecular sieves, most of the sodium cations in a 4A molecular sieve are substituted with calcium cation and most of the pores in the 5A molecular sieve have about a 5 Å diameter.

Zeolite X, for example, has an ideal composition given by:

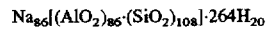

$$Na_{86}[(AlO_2)_{86}\cdot(SiO_2)_{106}]\cdot264H_2O$$

Cations may be exchanged so that the above formula is not absolute. Zeolites X and Y have topologically similar aluminosilicate framework structures, although they are distinct zeolite species with characteristic differences. The chemical compositions of zeolites X and Y are related to the synthesis method. The zeolites are distinguished on the basis of chemical composition, structure and their related physical and chemical properties. Differences are found in the cation composition and distribution, the Si/Al ratio and possible Si—Al ordering in tetrahedral sites. Typically, the Si/Al ratio for a zeolite X is between 1 and 1.5 whereas it is greater than 1.5 for a Y zeolite. Zeolites HY and USY may be obtained from NaY zeolites by different schemes: thermal decomposition of $NH_4^+$, hydrogen ion exchange, hydrolysis of a zeolite containing multivalent cations during dehydration. By the use of "zeolite" or "molecular sieve" as used herein is meant to include aluminosilicates, aluminophosphates, silica aluminophosphates, silicates and titanium aluminosilicates.

For purposes of the present invention, suitable molecular sieves include 3A, 4A, 5A, 13X NaY, HY and USY with 3A and 4A molecular sieves being preferred.

Desiccant suitable for use in the present invention can have a particle size ranging from 0.1 to 50 µm with a preferred particle size being 1 to 4 µm.

In the present invention, any type of fibrous material can be used, including both fibrillated or non-fibrillated fibers. The fibers are formed by standard paper-making processes into adsorbent paper or desiccant paper having adsorbent or desiccant contained therein. Examples of such fibers include wood pulp, e.g., cellulosic fibers, and synthetic fibers and mixtures thereof. Inorganic fibers, such as glass or metal fibers and rock wool, etc., are not particularly suitable but may be used in conjunction with fibrillated organic fibers. That is, non-fibrillated, inorganic and organic fibers may be used in conjunction with the fibrillated fibers. The amount of fibrillated and non-fibrillated fibers can be adjusted to suit the particular need. By fibrillated fiber as used herein is meant fiber shafts which are split at their ends to form fibrils, i.e., fine fibers or filaments much finer than the fiber shafts. Non-fibrillated fibers can include resin-impregnated fibers.

Examples of fibrillated, synthetic organic fibers useful in the invention include polymeric fibers selected from the group consisting of high-density polyethylenes, high-density polypropylenes, aromatic polyamides (aramids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene). Synthetic, organic fibers can be in staple form (chopped yarns), fabricated form (staple that has been refined) or extruded/precipitated form (i.e., polymer dissolved in a solvent precipitated by a non-solvent or other forming technique).

The preferred fibers for forming into desiccant paper for use in the present invention are fibrillated aramid and acrylic fibers. The preferred aramid fiber is formed from a long-chain synthetic aromatic polyamide having at least 85% of the amide (—CONH—) linkages directly attached to the two aromatic rings. A preferred fibrillated aramid fiber is available from E. I. du Pont de Nemours & Company under the designation KEVLAR® 303. In forming fibrillated KEVLAR® material, high shear is applied to KEVLAR® fiber shafts which split at their ends into fibrils to create a tree-like structure. In the production of adsorbent or desiccant paper, the fibrils interlock to enhance the paper strength and provide increased area for capturing or securing adsorbent particles. Additional refining of the fibers may be performed to further enhance paper strength. KEVLAR® is stable in oxidizing atmospheres up to 450° C. Other high-temperature aramid fibers such as NOMEX® available from Du Pont, TWARON® available from AKZO Fibers Inc., and TEIJIN-CONEX® and TECHNORA® available from Teijin Ltd. Japan, are also suitable materials.

Other preferred fiber which have been found to be highly suitable in the present invention are acrylic fibers such as fibrillated acrylic fibers available from American Cyanamid under the designation CFF®.

It should be noted that if the fibers are not available in fibrillated form, fibers can be fibrillated by transferring a slurry of the fibers to a disc or other high shear refiner to split the ends of the chopped fibers or shafts to provide fibrils thereon. In addition, fibrillated shafts available from the manufacturer can be further refined to increase the degree of fibrillation on the shafts which results in a higher degree of interlocking and consequently stronger desiccant or adsorbent paper.

Thus, preferably the shafts or chopped fibers can be provided in a length in the range of 1 to 30 mm, and typically in the range of 3 to 15 mm, prior to fibrillation. Further, preferably the shafts or chopped fibers have a diameter in the range of 1 to 50, typically 5 to 25 µm, prior to fibrillation. In fibrillated form, such chopped fibers have fibrils extending therefrom having lengths in the range of 0.5 to 28 mm and preferably in the range of 1 to 10 mm, and such fibrils typically have a diameter in the range of 0.5 to 40 µm and preferably in the range of 1 to 10 µm.

The fibrillation of the chopped fibers is an important aspect of the present invention. That is, it has been discovered that not only do the fibrillated fibers provide for higher strength in the desiccant or adsorbent paper, but also, it provides for thinner desiccant paper which is very important because of the resultant reduced air flow pressure drop across the media during operation. Further, more efficient adsorption and desorption is achieved. That is, an enthalpy wheel can be made deeper or wider for better adsorption and yet not require higher pressures, thereby raising the efficiency of the wheel. For example, enthalpy wheels formed from the improved desiccant paper can have up to about 25% increase in depth for about the same pressure drop across the wheel.

The fibrillated fibers are important in yet another way. That is, surprisingly, it has been discovered that higher loading of desiccant or adsorbent can be achieved utilizing fibrillated fibers. That is, the fibrils not only provide for thinner and stronger adsorbent paper, but the fibrils provide additional surface area on and in which desiccant or adsorbent can attach or anchor. Thus, compared to non-fibrillated shafts, fibrillated fibers provide for higher loading of desiccant or adsorbent in paper having desiccant or adsorbent dispersed therein without loss in strength of the paper.

The paper of the present invention can be prepared by wet-laying the desiccant and fibrillated fibers into a continuous sheet or web or into a hand sheet. The paper may then be formed into a single-faced corrugated laminate, which is spirally wrapped to make the adsorbent wheel. The fibrillated organic fibers provide highly suitable reinforcement at levels as low as 15 wt. % of the total desiccant paper structure due to their strength and ability to interlock. Some desiccant papers of suitable strength can be made having less than 10 wt. % fibers with very high sorbent loading when made in accordance with the invention.

Desiccant or adsorbent paper used in wheels in accordance with the invention can comprise 5 to 85 wt. % desiccant or adsorbent, the remainder comprising fibrous material. Binder can be added as needed. For example, if cellulose fibers from wood pulp are used in sufficient quantity, binder does not have to be added. Typical composition ranges can comprise 5 to 70 wt. % desiccant or adsorbent, the remainder comprising fibrous material and binder. A typical composition comprises about 38 wt. % fibrous material, about 50 wt. % desiccant or adsorbent and about 12 wt. % binder. The adsorbent paper can contain 15 to 75 wt. %, typically 30 to 55 wt. %, fibrillated fibers, 1 to 20 wt. %, typically 5 to 15 wt. %, binder with the balance being adsorbent.

The desiccant or adsorbent paper thus formed containing solid desiccant or adsorbent dispersed therein during the paper manufacturing processes are formed into heat and moisture transfer bodies such as total energy transfer wheels or enthalpy wheels. Additionally, the adsorbent paper can be formed into mass transfer bodies such as adsorbent fillers for contaminants. For example, the desiccant or adsorbent paper can be formed into such wheels by the formation of corrugated paper having the desired thickness and periodicity and bonded to a flat paperboard of similar composition to produce a single-faced corrugated sheet. The single-faced corrugated sheet is spirally rolled into a wheel configuration with the passages or channels formed by the corrugations and flat paperboard being parallel to the axial direction of the wheel. To maximize heat and mass transfer, the paperboard should be as thin as possible while maintaining strength to minimize the pressure drop across the wheel. Thin paperboard permits the manufacture of smaller channels to provide higher surface area for heat and mass transfer.

In this manner, an enthalpy wheel can be manufactured that provides for improved levels of moisture and heat transfer. Further, the enthalpy wheel can be readily mass produced in a cost effective manner. Conventional papermaking equipment and corrugating equipment can be used for manufacturing.

Figure 3:
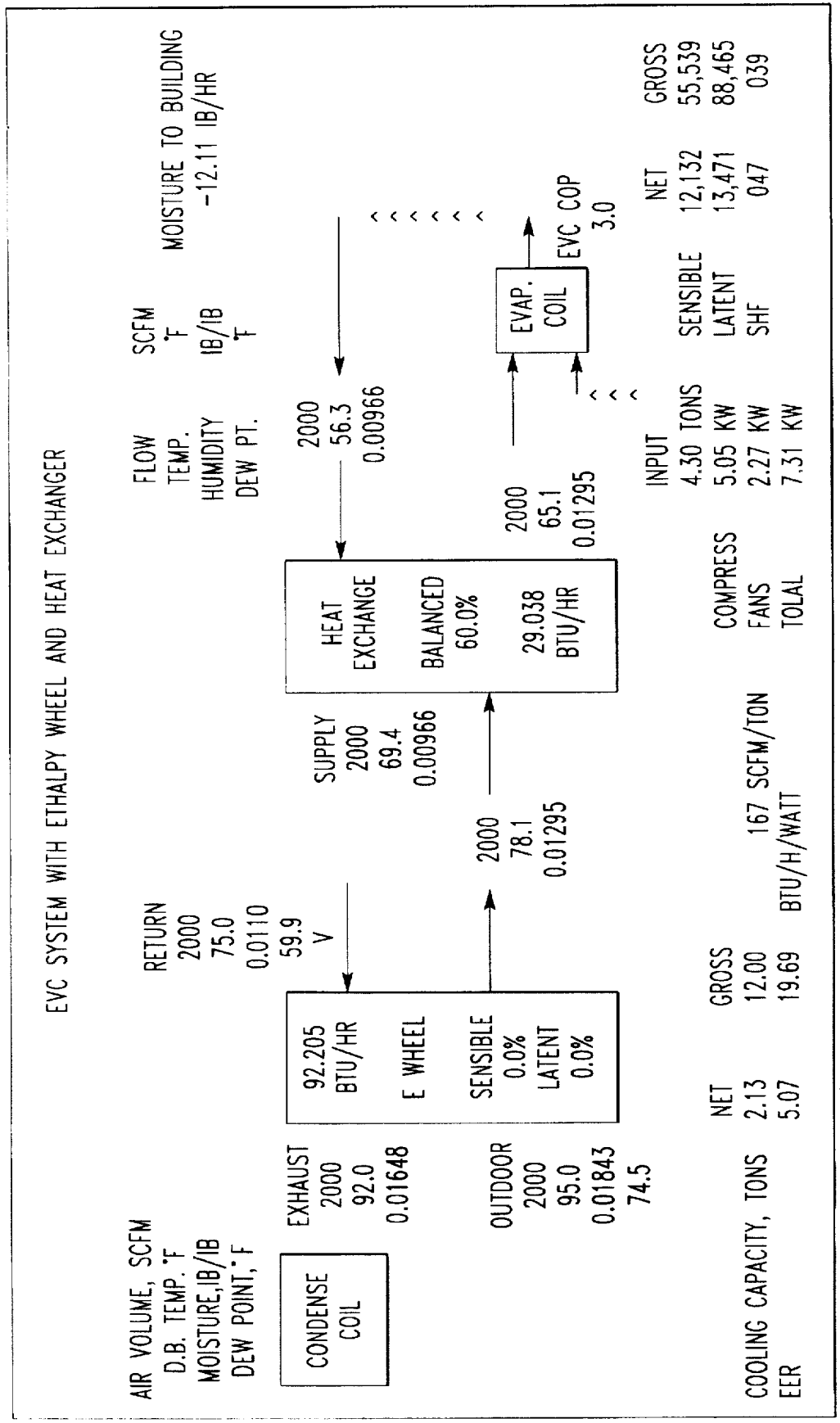
FIG. 3 illustrates air flows, temperatures and moisture levels through an enthalpy wheel and through a heat exchanger and evaporator coil.

The advantages of the present invention are illustrated by modeling a heat recovery and dehumidification system in accordance with the invention as set forth in FIG. 3. For purposes of the system, illustrated in FIG. 3, outdoor air at 95° F., 0.01843 lbs H$_2$O/lb of air and a dew point of 74.5° F. is introduced to an enthalpy wheel at 2000 SCFM. The air removed from the enthalpy wheel is reduced to a temperature of 78.1° F. and contained 0.01295 lbs H$_2$O/lb of air. The air from the enthalpy wheel is introduced to a first side of an air-to-air heat exchanger where the temperature is reduced to 65.1° F. The air from the air-to-air heat exchanger is introduced to an evaporative coil where the temperature is reduced to 56.3° F. and the humidity is reduced to 0.00986 lbs H$_2$O/lb of air. The air from the evaporative coil is introduced to the second side of an air-to-air heat exchanger to cool the air from the enthalpy wheel passing through the first side of the air-to-air heat exchanger. Thus, the air from the evaporative coil is heated in the air-to-air heat exchanger to a temperature of 69.4° F. while maintaining the same level of humidity. Thus, air is supplied to the conditioned space at 69.4° F. and a humidity level of 0.00966 lbs H$_2$O/lb of air.

For purposes of cooling and removing moisture, return air from the conditioned space is introduced to the enthalpy wheel at about 75° F. and a humidity level of 0.01100 lbs H$_2$O/lb of air. Air is exhausted from the enthalpy wheel at about 92° F. and a humidity level of 0.01648 lbs H$_2$O/lb of air. The state points are provided in Table 1. About 5.3 tons of cooling result from the use of the enthalpy wheel providing a total of 12 tons of cooling when treating 2000 SCFM of outdoor air. As noted, the conditioned air can be supplied to a conditioned space at 69.4° F., at a humidity level of 0.00966 lbs H$_2$O/lb of air which is well below building neutral conditions for both temperature and moisture content aiding in maintaining a low humidity in the conditioned space. The energy efficiency ratio (EER) which is the ratio of cooling capacity (BTU/h) to electricity used (watts) of the modeled unit including power required for blowers is 19.7 BTU/h/W.

TABLE 1

| | | Temp. °F. | Dew Pt. °F. | Rate cfm | Rate scfm | Flow lb/min | W lb/lb | W gr/lb | RH % | Enthalpy BTU/lb |
|---|---|---|---|---|---|---|---|---|---|---|
| 1 | Outdoor | 95.0 | 74.5 | 2170 | 2000 | 150.7 | 0.01843 | 129.0 | 51.8 | 43.13 |
| 2 | E Wheel Out | 78.1 | 674.5 | 2086 | 2000 | 150.7 | 0.01295 | 96.6 | 62.8 | 32.94 |
| 3 | Heat Exchanger Out | 65.1 | 64.5 | 2035 | 2000 | 150.7 | 0.01295 | 96.6 | 97.8 | 29.73 |
| 4 | Coil Out | 56.3 | 56.3 | 1991 | 2000 | 150.7 | 0.00966 | 67.6 | 100.0 | 24.02 |
| 5 | Supply | 69.4 | 56.4 | 2042 | 2000 | 150.7 | 0.00966 | 67.6 | 63.1 | 27.21 |
| 6 | Return | 75.0 | 59.9 | 2068 | 2000 | 150.7 | 0.01100 | 77.00 | 59.4 | 30.04 |
| 7 | Exhaust | 92.0 | 71.3 | 2152 | 2000 | 150.7 | 0.01648 | 115.4 | 51.1 | 40.24 |

Figure 4:
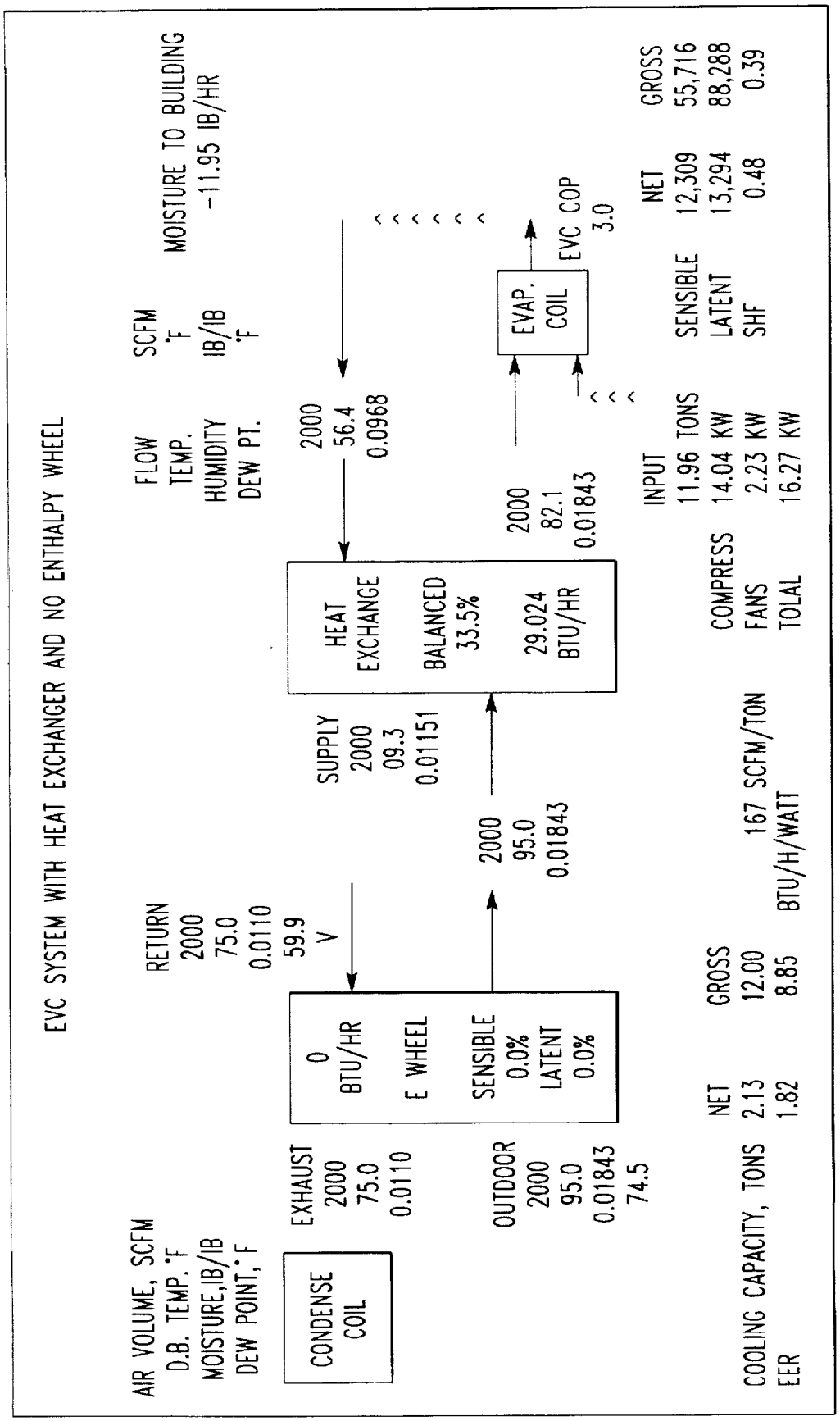
FIG. 4 illustrates air flows, temperatures and moisture levels through a seat exchanger and evaporator coil.

In the example modeled in FIG. 4, an enthalpy wheel is not used to move heat or moisture from the outdoor air. Further, air flow is maintained at 2000 SCFM. Thus, air is introduced to the first side of an air-to-air heat exchanger at a rate of 2000 SCFM, at 95° F. containing 0.01843 lbs H$_2$O/lb of air. The temperature is lowered to 82.1° F. and the humidity is still 0.01843 lbs H$_2$O/lb of air. After the evaporator coil, the temperature of the air is lowered to 56.4° F. and the humidity lowered to 0.00968 lbs H$_2$O/lb of air.

The air from the evaporator coil is introduced to the second side of the air-to-air heat exchanger where it is heated to 69.3° F. Thus, the supply air to the conditioned space had a temperature of 69.3° F. and a humidity level of 0.00968 lbs H$_2$O/lb of air. However, the disadvantage of this system is that the EER is 8.8 and the cost of operating system is over twice that for the system in FIG. 1. The state points are set forth in Table 2. The EER was only 8.8 BTU/h/W including power for blowers.

TABLE 2

|   | | Temp. °F. | Dew Pt. °F. | Rate cfm | Rate scfm | Flow lb/min | W lb/lb | W gr/lb | RH % | Enthalpy BTU/lb |
|---|---|---|---|---|---|---|---|---|---|---|
| 1 | Outdoor | 95.0 | 74.5 | 2170 | 2000 | 150.7 | 0.01843 | 129.0 | 51.8 | 43.13 |
| 2 | E Wheel Out | 95.0 | 74.5 | 2170 | 2000 | 150.7 | 0.01843 | 129.0 | 51.8 | 43.13 |
| 3 | Heat Exchanger Out | 82.1 | 74.5 | 2119 | 2000 | 150.7 | 0.01843 | 129.0 | 77.9 | 39.92 |
| 4 | Coil Out | 56.4 | 56.4 | 1991 | 2000 | 150.7 | 0.00968 | 67.8 | 100.0 | 24.05 |
| 5 | Supply | 69.3 | 56.5 | 2041 | 2000 | 150.7 | 0.00968 | 67.8 | 63.4 | 27.21 |
| 6 | Return | 75.0 | 59.9 | 2066 | 2000 | 150.7 | 0.01100 | 77.0 | 59.4 | 30.04 |
| 7 | Exhaust | 75.0 | 60.0 | 2066 | 2000 | 150.7 | 0.01100 | 77.0 | 59.4 | 30.04 |

Figure 5:
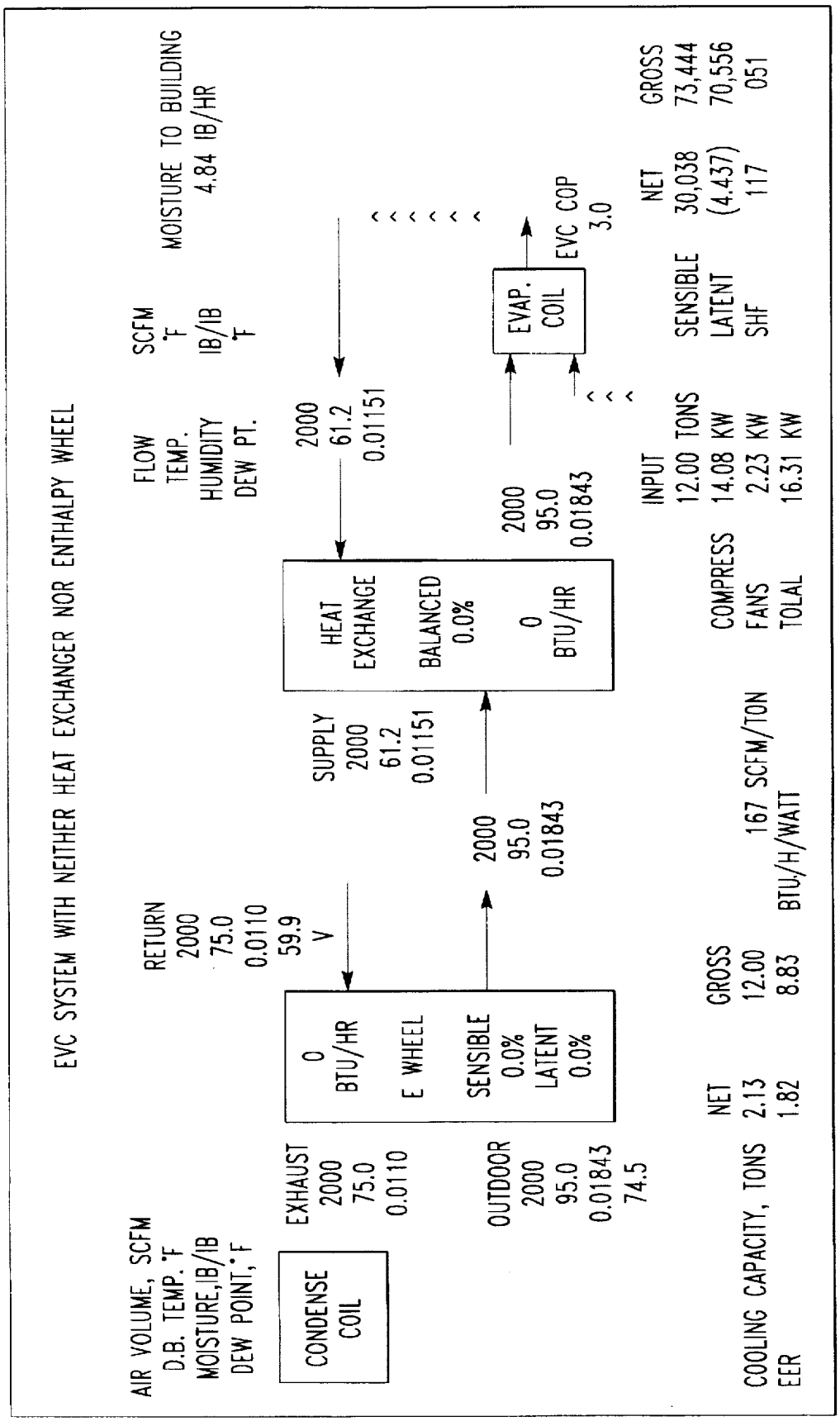
FIG. 5 illustrates air flows, temperatures and moisture levels through an evaporator.

For purposes of comparison, inlet air is introduced to an evaporator coil at 2000 SCFM, 95° F. and 0.01843 lbs $H_2O$/lb of air. No enthalpy wheel or air-to-air heat exchanger is used in this model. The air is cooled to 61.2° F. at 0.01151 lbs $H_2O$/lb of air, as shown in FIG. 5. The state points for this system are provided in Table 3. In this case, the supply or conditioned air is colder but the moisture level is above building neutral which is maximum 0.011 lbs $H_2O$/lb of air. This permits moisture to build up in the conditioned space unless the air-conditioning system is large enough to remove it. Thus, the high moisture places an additional load on the air-conditioning system. This system is also inefficient with operating costs being about the same as the system in FIG. 4. Thus, it will be seen that the systems of FIGS. 4 and 5 are much less efficient than that of the invention.

TABLE 3

|   | | Temp. °F. | Dew Pt. °F. | Rate cfm | Rate scfm | Flow lb/min | W lb/lb | W gr/lb | RH % | Enthalpy BTU/lb |
|---|---|---|---|---|---|---|---|---|---|---|
| 1 | Outdoor | 95.0 | 74.5 | 2170 | 2000 | 150.7 | 0.01843 | 129.0 | 51.8 | 43.13 |
| 2 | E Wheel Out | 95.0 | 74.5 | 2170 | 2000 | 150.7 | 0.01843 | 129.0 | 51.8 | 43.13 |
| 3 | Heat Exchanger Out | 95.0 | 74.5 | 2170 | 2000 | 150.7 | 0.01843 | 129.0 | 51.8 | 43.13 |
| 4 | Coil Out | 61.2 | 61.2 | 2016 | 2000 | 150.7 | 0.01151 | 80.6 | 100.0 | 27.21 |
| 5 | Supply | 61.2 | 61.2 | 2016 | 2000 | 150.7 | 0.01151 | 80.6 | 100.0 | 27.21 |
| 6 | Return | 75.0 | 59.9 | 2068 | 2000 | 150.7 | 0.01100 | 77.0 | 59.4 | 30.04 |
| 7 | Exhaust | 75.0 | 60.0 | 2068 | 2000 | 150.7 | 0.01100 | 77.0 | 59.4 | 30.04 |

While the invention has been described in terms of preferred embodiments, the claims appended hereto are intended to encompass other embodiments which fall within the spirit of the invention.

What is claimed is:

1. A heat recovery, dehumidifier and cooling system for ventilating fresh air to a conditioned space, the system comprised of:

(a) an enthalpy wheel or body for treating incoming outdoor air to remove heat and moisture therefrom;

(b) a means for introducing outdoor air to a first segment of said enthalpy wheel or body to provide pre-conditioned air;

(c) a heat exchanger in communication with said enthalpy wheel or body to receive pre-conditioned air having heat and moisture removed therefrom, said heat exchanger further lowering the temperature of said pre-conditioned air;

(d) a refrigerated surface in a first communication with said heat exchanger to receive pre-conditioned air exiting from said heat exchanger, said refrigerated surface further treating said pre-conditioned air to provide refrigerated air leaving said refrigerated surface having both lowered temperature and humidity, (i) said refrigerated surface in a second communication with said heat exchanger to permit said refrigerated air leaving said refrigerator surface to be in heat exchange relationship with said pre-conditioned air from said enthalpy wheel or body as said pre-conditioned air passes through said heat exchanger, said pre-conditioned air warming said refrigerated air as said refrigerated air passes through said heat exchanger to provide conditioned air, (ii) said heat exchanger in communication with said space to be conditioned to supply said conditioned air thereto;

(e) means for returning air from said conditioned space to said enthalpy wheel or body thereby providing a return air;

(f) means for passing said return air through a segment of said enthalpy wheel or body to exchange sensible and latent heat from said return air to said enthalpy wheel or body thereby cooling said enthalpy wheel or body; and (g) means for exhausting said return air to the atmosphere after passing through said enthalpy wheel or body.

2. The heat recovery, dehumidifier and cooling system in accordance with claim 1 wherein said enthalpy wheel or body is comprised of gas permeable media having a multiplicity of passageways therethrough through which an air stream can flow, the media comprised of fibrous support material and a desiccant material, said media capable of adsorbing heat and moisture from a warm, moist air stream flowing through said passageways and releasing heat and moisture to a cooler, drier stream flowing through said passageways.

3. The heat recovery, dehumidifier and cooling system in accordance with claim 2 wherein said media is comprised of 5 to 90 wt. % desiccant material.

4. The heat recovery, dehumidifier and cooling system in accordance with claim 2 wherein said fibrous material is selected from the group consisting of cellulosic fibers and synthetic organic fibers.

5. The heat recovery, dehumidifier and cooling system in accordance with claim 2 wherein the fibrous material is an organic synthetic fibrous material selected from the group consisting of polyethylene, polypropylene, acrylic, acetate, nylon and polyaramid fibers.

6. The heat recovery, dehumidifier and cooling system in accordance with claim 2 wherein said desiccant is selected from at least one of the group consisting of activated alumina, silica gels and crystalline zeolites.

7. The heat recovery, dehumidifier and cooling system in accordance with claim 2 wherein said desiccant is crystalline zeolites.

8. The heat recovery, dehumidifier and cooling system in accordance with claim 2 wherein said desiccant is a zeolite selected from one of the group consisting of 3A, 4A, 5A, 13X NaY, HY and USY.

9. The heat recovery, dehumidifier and cooling system in accordance with claim 2 wherein said desiccant is a zeolite selected from one of the group consisting of 3A and 4A zeolites.

10. The heat recovery, dehumidifier and cooling system in accordance with claim 2 wherein said desiccant is a 3A zeolite.

11. The heat recovery, dehumidifier and cooling system in accordance with claim 2 wherein said desiccant is a 4A zeolite.

12. The heat recovery, dehumidifier and cooling system in accordance with claim 1 including means for diverting a portion of the return air to said heat exchanger with said pre-conditioned air.

13. The heat recovery, dehumidifier and cooling system in accordance with claim 1 wherein said heat exchanger is a sensible heat exchanger.

14. The heat recovery, dehumidifier and cooling system in accordance with claim 1 wherein said heat exchanger is a heat pipe.

15. The heat recovery, dehumidifier and cooling system in accordance with claim 1 wherein said heat exchanger is an air-to-air heat exchanger.

16. The heat recovery, dehumidifier and cooling system in accordance with claim 1 wherein said heat exchanger is an air-to-liquid heat exchanger.

17. A heat recovery, dehumidifier and cooling system for ventilating fresh air to a conditioned space, the system having a condenser coil, an evaporator coil and a compressor, the system comprised of:

(a) an enthalpy wheel or body for treating air to remove heat and moisture therefrom;

(b) a duct for introducing air to a first segment of said enthalpy wheel or body to provide pre-conditioned air;

(c) a heat exchanger in communication with said enthalpy wheel or body to receive pre-conditioned air having heat and moisture removed therefrom, said heat exchanger further lowering the temperature of said pre-conditioned air;

(d) an evaporator coil in a first communication with said heat exchanger to receive pre-conditioned air exiting from said heat exchanger, said evaporator coil further treating said pre-conditioned air to provide refrigerated air leaving said evaporator coil having both lowered temperature and humidity.

(i) said evaporator coil in a second communication with said heat exchanger to permit said refrigerated air leaving said evaporator coil to be in heat exchange relationship with said pre-conditioned air from said enthalpy wheel or body as said pre-conditioned air passes through said heat exchanger, said pre-conditioned air warming said refrigerated air as said refrigerated air passes through said heat exchanger to provide conditioned air.

(ii) said heat exchanger in communication with said space to be conditioned to supply said conditioned air thereto;

(e) liquid refrigerant from a condenser coil adapted to pass through said evaporator coil;

(f) an expansion valve or orifice in fluid communication between said condenser coil and said evaporator coil for vaporizing said liquid refrigerant from said condenser coil into said evaporating coil thereby imparting cooling to said pre-conditioned air passing through said evaporator coil;

(g) a compressor in communication with said evaporator coil and said condenser coil for compressing vaporized refrigerant for recirculating back to said condenser coil;

(h) means for returning air from said conditioned space to said enthalpy wheel or body thereby providing a return air;

(i) means for passing said return air through a segment of said enthalpy wheel or body to exchange sensible and latent heat from said return air to said enthalpy wheel or body thereby cooling said enthalpy wheel or body; and means for exhausting said return air to the atmosphere after passing through said enthalpy wheel or body.

18. A heat recovery, dehumidifier and cooling system for ventilating fresh air to a conditioned space, the system having a condenser coil, an evaporator coil and a compressor, the system comprised of:

(a) an enthalpy wheel or body for treating incoming fresh air to remove heat and moisture therefrom, said enthalpy wheel or body comprised of a gas permeable media having a multiplicity of passageways through which a fresh air stream can flow, the media comprised of a fibrous support material and a zeolite desiccant selected from the group consisting of 3A, 4A, 5A, 113X, NaY, HY and USY, said media capable of adsorbing heat and moisture from a warm, humid stream of fresh air and releasing heat and moisture to a cooler, drier stream;

(b) means for introducing fresh air to a first segment of said enthalpy wheel or body to provide pre-conditioned air;

(c) a heat exchanger in communication with said enthalpy wheel or body to receive pre-conditioned air having heat and moisture removed therefrom, said heat exchanger further lowering the temperature of said pre-conditioned air;

(d) an evaporator coil in a first communication with said heat exchanger to receive pre-conditioned air exiting from said heat exchanger, said evaporator coil further treating said pre-conditioned air to provide refrigerated air leaving said evaporator coil having both lowered temperature and humidity.

(i) said evaporator coil in a second communication with said heat exchanger to permit said refrigerated air leaving said evaporator coil to be in heat exchange relationship with said pre-conditioned air from said enthalpy wheel or body as said pre-conditioned air passes through said heat exchanger, said pre-conditioned air warming said refrigerated air as said refrigerated air passes through said heat exchanger to provide conditioned air.

(ii) said heat exchanger in communication with said space to be conditioned to supply said conditioned air thereto;

(e) liquid refrigerant from a condenser coil adapted to pass through said evaporator coil;

(f) an expansion valve or orifice in fluid communication between said condenser coil and said evaporator coil for vaporizing said liquid refrigerant from said condenser coil into said evaporating coil thereby imparting cooling to said pre-conditioned air passing through said evaporator coil;

(g) a compressor in communication with said evaporator coil and said condenser coil for compressing vaporized refrigerant for recirculating back to said condenser coil;

(h) means for returning air from said conditioned space to said enthalpy wheel or body thereby providing a return air;

(i) means for passing said return air through a segment of said enthalpy wheel or body to exchange sensible and latent heat from said return air to said enthalpy wheel or body thereby cooling said enthalpy wheel or body;

(j) means for exhausting said return air to the atmosphere after passing through said enthalpy wheel or body.

19. A method of conditioning air to be introduced to a conditioned space by removing heat and moisture therefrom, the method comprising the steps of:

(a) providing an enthalpy wheel or body for treating air to remove heat and moisture therefrom;

(b) introducing air to a first segment of said enthalpy wheel or body to remove heat and moisture therefrom to provide pre-conditioned air;

(c) providing a heat exchanger in communication with said enthalpy wheel or body;

(d) passing said pre-conditioned air through a first side of said heat exchanger to remove heat therefrom;

(e) providing an evaporator coil in communication with said heat exchanger;

(f) introducing said pre-conditioned air from said heat exchanger to said evaporator coil to further lower the temperature and humidity to provide refrigerated air;

(g) directing refrigerated air through a second side of said heat exchanger thereby raising the temperature of said refrigerated air as said refrigerated air passes through said heat exchanger to provide conditioned air for introducing to a conditioned space; and (h) supplying refrigerant to said evaporator coil for cooling said pre-conditioned air by vaporizing said refrigerant in said evaporator coil and thereafter recirculating said vaporized refrigerant through a compressor to provide compressed refrigerant vapor and then recirculating the compressed refrigerant vapor through a condenser coil for condensing said compressed refrigerant vapor prior to its returning to said evaporator coil.

20. The method in accordance with claim 19 wherein said enthalpy wheel or body is comprised of gas permeable media having a multiplicity of passageways therethrough through which an air stream can flow, the media comprised of fibrous support material and a desiccant material, said media capable of adsorbing heat and moisture from a warm, moist air stream flowing through said passageways and releasing heat and moisture to a cooler, drier stream flowing through said passageways.

21. The method in accordance with claim 20 wherein said media is comprised of 5 to 90 wt. % desiccant material.

22. The method in accordance with claim 20 wherein said fibrous material is selected from the group consisting of cellulosic fibers and synthetic organic fibers.

23. The method in accordance with claim 20 wherein the fibrous material is an organic synthetic fibrous material selected from the group consisting of polyethylene, polypropylene, acrylic, acetate, nylon and polyaramid fibers.

24. The method in accordance with claim 20 wherein said desiccant is selected from at least one of the group consisting of activated alumina, silica gels and crystalline zeolites.

25. The method in accordance with claim 20 wherein said desiccant is crystalline zeolites.

26. The method in accordance with claim 20 wherein said desiccant is a zeolite selected from one of the group consisting of 3A, 4A, 5A, 13X, NaY, HY and USY.

27. The method in accordance with claim 20 wherein said desiccant is a zeolite selected from one of the group consisting of 3A and 4A zeolites.

28. The method in accordance with claim 20 wherein said desiccant is a 3A zeolite.

29. The method in accordance with claim 20 wherein said desiccant is a 4A zeolite.

30. The method in accordance with claim 20 including the step of regenerating said enthalpy wheel or body by contacting said wheel or body with air exhausted from said conditioned space.

31. The method in accordance with claim 30 including the step of cooling said condenser coil with air used to regenerate said enthalpy wheel or body.

32. The method in accordance with claim 20 including the step of cooling said condenser coil with outside air.

33. The method in accordance with claim 19 including the step of providing a return air from said conditioned space and directing said return air through said enthalpy wheel or body thereby cooling said enthalpy wheel or body.

34. The method in accordance with claim 33 including diverting a portion of said return air to said pre-conditioned air for passing through said heat exchanger.

35. The method in accordance with claim 19 wherein said heat exchanger is a sensible heat exchanger.

36. The method in accordance with claim 19 wherein said heat exchanger is an air-to-air heat exchanger.

37. The method in accordance with claim 19 wherein said heat exchanger is a heat pipe.

38. The method in accordance with claim 19 wherein said heat exchanger is an air-to-liquid heat exchanger.

39. A method of conditioning air to be introduced to a conditioned space by removing heat and moisture therefrom, the method comprising the steps of:

(a) providing an enthalpy wheel or body for treating air to remove heat and moisture therefrom;

(b) introducing air to a first segment of said enthalpy wheel or body to remove heat and moisture therefrom to provide pre-conditioned air;

(c) providing a heat exchanger in communication with said enthalpy wheel or body;

(d) passing said pre-conditioned air through a first side of said heat exchanger to remove heat therefrom;

(e) providing an evaporator coil in communication with said heat exchanger;

(f) introducing said pre-conditioned air from said heat exchanger to said evaporator coil to further lower the temperature and humidity to provide refrigerated air;

(g) directing refrigerated air through a second side of said heat exchanger thereby raising the temperature of said refrigerated air as said refrigerated air passes through said heat exchanger to provide conditioned air for introducing to a conditioned space;

(h) supplying refrigerant to said evaporator coil for cooling said pre-conditioned air by vaporizing said refrigerant in said evaporator coil and thereafter recirculating said vaporized refrigerant through a compressor to provide compressed refrigerant vapor and then recirculating the compressed refrigerant vapor through a condenser coil for condensing said compressed refrigerant vapor prior to its returning to said evaporator coil (i) returning air from said conditioned space to said enthalpy wheel or body thereby providing a return air; and (j) passing said return air through a segment of said enthalpy wheel or body to exchange sensible and latent heat from said return air to said enthalpy wheel or body thereby cooling said enthalpy wheel or body.

40. The method in accordance with claim 39 including diverting a portion of said return air to said pre-conditioned air for passing through said heat exchanger.

41. The method in accordance with claim 39 wherein said heat exchanger is a sensible heat exchanger.

42. The method in accordance with claim 39 wherein said heat exchanger is an air-to-air heat exchanger.

43. The method in accordance with claim 39 wherein said heat exchanger is a heat pipe.

44. The method in accordance with claim 39 wherein said heat exchanger is an air-to-liquid heat exchanger.

* * * * *